United States Patent [19]

Seals

[11] 4,337,578
[45] Jul. 6, 1982

[54] MEASURING DEVICE

[76] Inventor: Emery L. Seals, Rte. 5, Box 294, Morristown, Tenn.

[21] Appl. No.: 244,243

[22] Filed: Mar. 16, 1981

[51] Int. Cl.³ .............................................. G01B 5/02
[52] U.S. Cl. ............................... 33/125 R; 33/143 M; 33/158; 28/147
[58] Field of Search .......................... 28/147; 112/285; 30/124; 242/85.1; 33/143 M, 158, 159, 174 R, 125 R

[56] References Cited

U.S. PATENT DOCUMENTS

| | | | |
|---|---|---|---|
| 2,353,640 | 7/1944 | Bishop | 28/147 |
| 2,596,731 | 5/1952 | Seme | 33/143 J |
| 3,854,179 | 12/1974 | Montoya | 28/147 |
| 3,857,143 | 12/1974 | Montory | 30/124 |

FOREIGN PATENT DOCUMENTS

| | | | |
|---|---|---|---|
| 370989 | 11/1935 | Fed. Rep. of Germany | 242/85.1 |
| 575360 | 2/1946 | United Kingdom | 33/143 M |

*Primary Examiner*—Harry N. Haroian
*Attorney, Agent, or Firm*—Luedeka & Fitch

[57] ABSTRACT

A device for measuring lengths of yarn and the like has an elongated base member with a first fixed position post and a second movable post. The second post is moved toward and away from the first post to a preselected position for measuring lengths of yarn and the like. A complete turn of yarn encompassing both posts measures the desired length of yarn.

1 Claim, 4 Drawing Figures

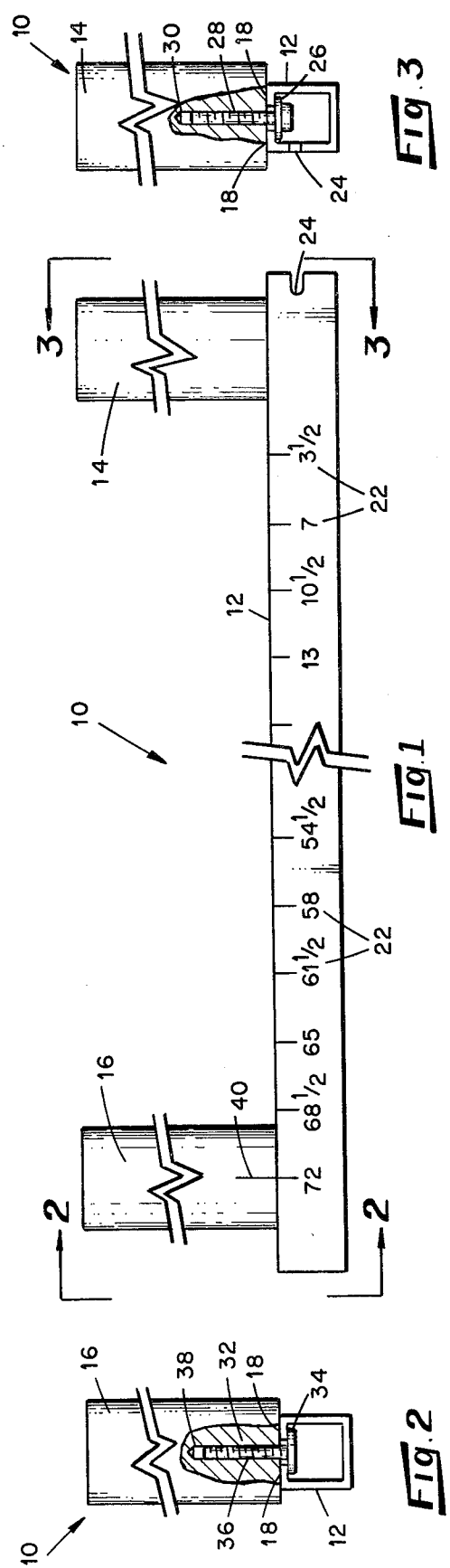

MEASURING DEVICE

In preparation for many craft arts such as weaving and macrame using lengths of yarn or the like, it is a time consuming and aggrevating task to cut the yarn to preselected lengths in preparation for use.

A typical method for preparing cut lengths of yarn and thread is to use a ruler or yard stick. The yarn is laid along the ruler or yard stick and cut to length. When a length of yarn longer than the measuring device is required, the measuring device must be incrementally moved along the yarn, or the yarn along the measuring device. Of course, the previous relative loation of the measuring device and yarn must be marked or otherwise kept track of so that the accumulated measurements total the desired length. This is method is both awkward, time consuming and error prone.

Therefore, it is an object of the present invention to provide a measuring device which quickly and accurately measures lengths of yarn and the like.

It is another object of the present invention to provide a measuring device for yarn and the like which requires a minimum of dexterity to use.

It is a further object of the present invention to provide a measuring device which allows one to concurrently measure a plurality of equal lengths of yarn and the like.

It is yet another object of the present invention to provide a measuring device which allows one to quickly, accurately and easily measure a length of yarn and the like which is longer than the measuring device.

These and other objects and advantages of the present invention will become apparent with reference to the following specification and drawings wherein:

FIG. 1 is a foreshortened side view of a measuring device embodying the present invention;

FIG. 2 is an end view, partially in cross-section, of the measuring device of FIG. 1 taken in the direction of arrows 2—2 in FIG. 1;

FIG. 3 is an end view, partially in cross-section, of the measuring device of FIG. 1 taken in the direction of arrows 3—3 in FIG. 1; and, FIG. 4 is a top view of the measuring device of FIG. 1.

The present invention provides a device for measuring lengths of yarn and the like comprising an elongated base member having a fixed position first post projecting from a longitudinal side of the base member and a second post selectively movable post projecting from the same longitudinal side of the base member. The second post is selectively movable along the base member toward and away from the first post. The yarn is measured by looping the yarn about both posts to encompass both posts. A complete turn encompassing both posts measures a desired length of yarn.

FIGS. 1, 2, 3 and 4 illustrate a measuring device, generally denoted as the numeral 10 comprising an elongated base member 12 having a first post 14 and a second post 16 projecting from a longitudinal side of the base member 12. As illustrated, the first and second posts are cylindrical and of equal diameter and height.

The elongated base member 12 is hollow, and has a generally U-shaped transverse cross-section, as can be best seen in FIGS. 2 and 3. As illustrated in FIGS. 2, 3 and 4, the free edges 18 of the U-shaped cross-section base member 12 generally extend toward each other to define an elongated slot 20 extending longitudinally of the base member 12. As can be seen in FIG. 1, the elongated base member 12 is provided with indicia, denoted as the numeral 22, which is used to properly position the movable second post 16 along the base member 12 to measure a desired length of yarn. The indicia is a plurality of marks illustrated as lines spaced apart along one longitudinal wall of the base member 12 and numbers associated with each line. Each number corresponds to the length of yarn encompassing the first and second posts 14 and 16 when the second post 16 positioned at that numbered line. The first measuring mark, corresponding to the shortest length measurable by the measuring device 10, is spaced from the centerline of the first post 14 toward the second post 16 by a distance substantially equal to the sum of the radii of the first and second posts 14 and 16 corresponds to a linear measurement of yarn substantially equal to the circumference of the first post plus two times the diameter of the first post. The succeeding measuring lines 22 can be spaced apart at virtually any convenient distance. The base member 12 also is formed with a yarn anchoring slot 24 formed at one of its ends. The yarn anchoring slot 24 is open at one end to accommodate the insertion of yarn and extends generally longitudinally of the base member 12.

As can be seen in FIGS. 1 and 4, the first post 14 is mounted at a fixed position to the base member 12 proximate the end of the base member 12 having the yarn anchoring slot 24 and projects from the longitudinal side of the base member 12 having the elongated slot 20 at a right angle to the longitudinal axis of the base member 12. The first post 14 can be mounted to the base member 12 by virtually any conventional or otherwise convenient means. In FIG. 3 the first post 14 is illustrated as being fixedly attached to the base member 12 by means of a washer 26 which has a greater diameter than the width of the slot 20 and is positioned in the hollow interior of the base member 12. A threaded fastener, such as a screw 28, is inserted through the washer from the hollow interior of the base member 12 and projects outwardly therefrom through the slot 20. The first post 14 is formed with a threaded aperture 30 which threadably receives the shank of the screw 28 so that the free edges 18 of the base member 12 on either side of the slot 20 are tightly gripped between the washer 26 and one end of the first post 14 thus fixedly attaching the first post 14 to the base member 12.

As can be seen in FIGS. 1 and 3, the second post 16 is connected to the base member 12 for selected movement toward and away from the first post 14 along the slot 20. The second post 16 also projects from the longitudinal side of the base member 12 having the elongated slot 20 at a right angle to the longitudinal axis of the base member 12. Thus, the first and second posts 14 and 16 are parallel to each other. As illustrated in FIG. 2, the second post 16 is mounted to the base member 12 for selected movement by means of, for example, threaded fastener means 32 which has a head 34 at one end which is larger than the slot 20 and a threaded shank 36 projecting from the head 34. The head 34 of the threaded fastener 32 is disposed in the hollow interior of the elongated base member 12 beneath the free edges 18 of the base member 12 defining the slot 20 and the threaded shank 36 projects outwardly of the base member 12 through the slot 20 generally perpendicular to the longitudinal axis of the base member 12. The second post 16 is formed with a threaded aperture 38 which threadably receives the thread shank 36 of the fastener 32. In order to fix the second post 16 at a desired location along the base member 12, the second post 16 is threaded down over the threaded shank 36 toward the head 34 of the fastener 32 to tightly capture the free edges 18 of the base member 12 defining the slot 12 between one end of the second post 16 and the head 34 of the fastener 32. To move the second post toward or away from the first post 14 along the slot 20, the second post 16 is partially unthreaded from the shank 36 of the fastener 32 and moves away from the head 34 of the fastener 32 so that the free edges 18 of the base member 12 are no longer tightly captured between one end of the second post 16 and the head 34 of the fastener 32. The second post 16 also includes index means, generally denoted as the numeral 40, which is to be aligned with the measuring indicia 22 of the base member 12 to accurately position the second post 16 at a position along the base member 12 relative to the first post 14 corresponding to a desired length of yarn to be measured.

The operation of the measuring device 10 will best be understood by reference to FIG. 4. To measure a length of yarn, denoted as the number 42, a long length of yarn is pulled from a source of yarn (not shown) and inserted into the yarn anchoring slot 24. This anchors the yarn in position so that the free length of yarn extending from slot 24 can be wrapped about both the first post 14 and second post 16 to form a loop or turn of yarn 42 encompasses both the first post 14 and second post 16. A complete turn of yarn 42 encompassing both posts 14 and 16 measures the desired length of yarn. The turn of yarn 42 is cut where it overlaps at the first post 14, indicated at the numeral 44 in FIG. 4, resulting in a length of yarn 42 having the desired length. The yarn can be cut with, for example, a knife, razor blade, or scissors. If a plurality of equal lengths of yarn are to be measured, the yarn is looped about both the first and second posts 14 and 16 a number of times corresponding to the number of equal lengths of yarn required and, again, the yarn is cut at its locations of overlap 44 resulting in a plurality of equal lengths of yarn having the desired length. If a length of yarn is required which is longer than twice the maximum distance by which the first and second posts 14 and 16 can be separated from each other along the base member 12, the second post 16 can be located relative to the first post 14 at a position corresponding to an increment of the desired length, for example, one third of the length of yarn desired. The yarn would then be looped around to encompass the posts 14 and 16 three times and cut at the first overlap only, thus, resulting in the length of yarn required.

It should be clearly understood that the measuring indicia 22 on the base member 12 is the position for the second post 16 relative to the first post 14 which will result in a loop of yarn encompassing both posts 14 and 16 which has a length corresponding to the dimension indicated by the indicia 22. It is not the actual distance between the first and second posts.

The base member 12 must be rigid enough not to deflect or bend when the yarn is wrapped around the posts 14 and 16 which would cause an erroneous measurement of the yarn.

A practical length for the base member 12 of the measuring device 10 has been found to be about 36 to 38 inches long. A base member 12 of this length is versatile for measuring lengths of yarn most often encountered and is short enough for easy use and storage. The base member 12 is also about one-half of an inch wide and one-half of an inch high, and the first and second posts are about three-quarters of an inch in diameter and about seven inches long.

The foregoing description is given primarily for clearness of understanding and no limitations are to be understood therefrom for modifications will become obvious to one skilled in the art upon reading this disclosure and can be made without departing from the spirit of the invention and scope of the appended claims.

What is claimed is:

1. A device for measuring lengths of yarn and the like comprising:

an elongated base member having a generally U-shaped cross section which defines a longitudinally extending slot;

a first cylindrical post projecting from a longitudinal side of said base member and fixedly connected to said elongated base member at one end of said longitudinally extending slot;

a second cylindrical post projecting from the same longitudinal side of said base member as said first cylindrical post;

means for mounting said second post member to said base member in said longitudinally extending slot for selected movement toward and away from said first post member along said longitudinally extending slot;

said first and second posts being of the same diameter; and said mounting means comprising:

fastener means having a head larger than the width of said slot of said base member and disposed in the hollow interior of said base member, and a threaded shank projecting from said head through said elongated slot of said base member; and, said second post being formed with a threaded aperture for threadably receiving said threaded shank;

said second post being theaded onto said shank to tightly capture the edges of said base member defining said slot between said second post and said head of said fastener means, at any location along said elongated slot;

measuring indicia comprising a plurality of marks on said base member, the first mark corresponding to the shortest length measurable by said measuring device being spaced from the centerline of said first post toward said second post by a distance substantially equal to the sum of the radii of said first and second posts and corresponds to a linear measurement substantially equal to the circumference of said first post plus two times the diameter of said first post.

whereby a complete turn of yarn encompassing said first and second posts is the length denominated by said indicia.

* * * * *